(12) United States Patent  
Klewer et al.

(10) Patent No.: US 9,698,435 B2
(45) Date of Patent: Jul. 4, 2017

(54) SYSTEM AND METHOD FOR COOLING AN AIRCRAFT FUEL CELL SYSTEM

(71) Applicant: Airbus Operations GmbH, Hamburg (DE)

(72) Inventors: Guido Klewer, Hamburg (DE); Hauke Peer Luedders, Hamburg (DE); Sebastian Mock, Hamburg (DE); Christian Mueller, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 393 days.

(21) Appl. No.: 14/327,759

(22) Filed: Jul. 10, 2014

(65) Prior Publication Data

US 2015/0017559 A1 Jan. 15, 2015

(30) Foreign Application Priority Data

Jul. 11, 2013 (DE) ........................ 10 2013 213 573

(51) Int. Cl.
*H01M 8/04701* (2016.01)
*H01M 8/04007* (2016.01)
*B64D 41/00* (2006.01)

(52) U.S. Cl.
CPC ... *H01M 8/04701* (2013.01); *H01M 8/04067* (2013.01); *H01M 8/04708* (2013.01);
(Continued)

(58) Field of Classification Search
CPC ......... H01M 8/04701; H01M 8/04067; H01M 8/04708; H01M 2250/20
See application file for complete search history.

(56) References Cited

U.S. PATENT DOCUMENTS

2007/0128488 A1* 6/2007 Aoki ................. H01M 8/04022
429/415
2010/0273079 A1* 10/2010 Hinsenkamp ..... H01M 8/04029
429/442
(Continued)

FOREIGN PATENT DOCUMENTS

DE 102007054246 5/2009
DE 102007060428 5/2009
(Continued)

OTHER PUBLICATIONS

German Search Report, Jul. 11, 2013.

*Primary Examiner* — Jane Rhee
(74) *Attorney, Agent, or Firm* — Greer, Burns & Crain, Ltd.

(57) ABSTRACT

A system for cooling an aircraft fuel cell system comprising a first cooling circuit thermally coupled to a first fuel cell, to remove thermal energy generated by the first fuel cell during operation from the first fuel cell, and a first heat exchanger arranged in the first cooling circuit and adapted to transfer thermal energy, removed from the first fuel cell via the first cooling circuit, to the aircraft surroundings. The system comprises a second cooling circuit thermally coupled to a second fuel cell, to remove thermal energy generated by the second fuel cell during operation from the second fuel cell, and a second heat exchanger arranged in the second cooling circuit and adapted to transfer thermal energy, removed from the second fuel cell via the second cooling circuit, to the aircraft surroundings. The first cooling circuit is thermally couplable to the second cooling circuit.

14 Claims, 2 Drawing Sheets

(52) U.S. Cl.
CPC ... *B64D 2041/005* (2013.01); *H01M 2250/20* (2013.01); *Y02T 90/32* (2013.01); *Y02T 90/36* (2013.01)

(56) References Cited

U.S. PATENT DOCUMENTS

| | | |
|---|---|---|
| 2011/0003224 A1 | 1/2011 | Schiebert |
| 2012/0160445 A1 | 6/2012 | Baumgardt et al. |
| 2012/0248252 A1 | 10/2012 | Al-Ali et al. |

FOREIGN PATENT DOCUMENTS

| | | |
|---|---|---|
| DE | 102009013159 | 9/2010 |
| DE | 102009061028 | 1/2011 |
| DE | 102009048394 | 4/2011 |
| WO | 2009077048 | 6/2009 |
| WO | 2010105744 | 9/2010 |

* cited by examiner

SYSTEM AND METHOD FOR COOLING AN AIRCRAFT FUEL CELL SYSTEM

CROSS-REFERENCES TO RELATED APPLICATIONS

This application claims the benefit of the German patent application No. 10 2013 213 573.4 filed on Jul. 11, 2013, the entire disclosures of which are incorporated herein by way of reference.

BACKGROUND OF THE INVENTION

The present invention relates to a system and a method for cooling a fuel cell system installed on board an aircraft.

Fuel cell systems enable low-emission, highly efficient generation of electric current. For this reason, efforts are currently being made to use fuel cell systems to generate electrical energy in various mobile applications, such as for example in automotive engineering, in shipping or in aviation. It is, for example, conceivable in an aircraft to replace the generators, which are currently used to supply power on board and are driven by the main engines or the auxiliary turbine, with a fuel cell system. A fuel cell system, moreover, could also be used to supply the aircraft with emergency power and replace the ram air turbine hitherto used as an emergency power system. Besides electrical energy, a fuel cell during operation generates thermal energy, which has to be removed from the fuel cell with the aid of a cooling system in order to prevent overheating of the fuel cell. A fuel cell used in an aircraft, for example for the on-board power supply, has to be designed in such a way that it is capable of meeting the demand for electrical energy. However, a fuel cell that has a high capacity with regard to generating electrical energy, also generates, due to the efficiency, corresponding thermal energy, and therefore has a corresponding cooling requirement.

In principle, a fuel cell system used on board an aircraft can be cooled in various ways. For example, DE 10 2009 013 159 A1 or WO 2010/105744 A2 describes a cooler which is integrated into an outer skin of the aircraft and through which ambient air can flow in order to remove waste heat generated by a fuel cell system to the aircraft surroundings.

By contrast, DE 10 2009 048 394 A1 proposes coupling a cooling circuit, which removes thermal energy generated by a fuel cell system during operation from the fuel cell system, thermally to a fuel tank, in order to utilize fuel held in the fuel tank as a heat sink for cooling the fuel cell system.

Finally, from DE 10 2007 060 428 B3 or WO 2009/077048 A1 there is known an evaporative cooling system for cooling a fuel cell system, in which a cooling medium is converted from the liquid to the gaseous state of matter by the thermal energy generated during operation of the fuel cell system.

SUMMARY OF THE INVENTION

An object on which the invention is based is to provide an efficient system and method for cooling an aircraft fuel cell system.

A system for cooling an aircraft fuel cell system comprises a first cooling circuit which is thermally coupled to a first fuel cell, in order to remove thermal energy generated by the first fuel cell during operation from the first fuel cell. A liquid or a gaseous coolant may flow through the first cooling circuit. Furthermore, it is conceivable to circulate in the first cooling circuit a two-phase coolant, i.e., a coolant which is converted from liquid to the gaseous state by the thermal energy of the first fuel cell and subsequently condensed out again in a condenser. Furthermore, the system comprises a first heat exchanger arranged in the first cooling circuit. The first heat exchanger is adapted to transfer thermal energy, removed from the first fuel cell via the first cooling circuit, to the aircraft surroundings. In the first cooling circuit, the first heat exchanger therefore serves as a heat sink for the waste heat generated by the first fuel cell during operation.

The system for cooling an aircraft fuel cell system furthermore comprises a second cooling circuit which is thermally coupled to a second fuel cell, in order to remove thermal energy generated by the second fuel cell during operation from the second fuel cell. Similarly to the first cooling circuit, the second cooling circuit may, as required, also be operated with a liquid, a gaseous or a two-phase coolant. A second heat exchanger is arranged in the second cooling circuit. The second heat exchanger is adapted to transfer thermal energy, removed from the second fuel cell via the second cooling circuit, to the aircraft surroundings and therefore to serve as a heat sink for the thermal energy generated by the second fuel cell during operation.

The aircraft fuel cell system to be cooled by means of the cooling system according to the invention therefore comprises two fuel cells which generate heat during operation and which are cooled by two cooling circuits formed, in principle, separately from one another. The fuel cells are preferably configured in the form of fuel cell stacks which comprise a plurality of individual cells arranged one above the other. The first cooling circuit is, however, thermally couplable to the second cooling circuit.

A redundant cooling of the two fuel cells of the aircraft fuel cell system is ensured by the thermal coupling of the two cooling circuits, since in the event of a failure of one cooling circuit, the cooling circuit which is still functional can be used to ensure an emergency cooling of both fuel cells of the aircraft fuel cell system, for example until the operation of the fuel cell, cooled by the failed cooling circuit, has been properly ended. Furthermore, in a system in which the two fuel cells are operated at different power, the cooling energy provided by the cooling circuits can be optimally distributed to the fuel cells to be cooled, since excess cooling energy which is provided by the cooling circuit which is assigned to the fuel cell operated at lower power, can be used to cool the fuel cell operated at higher power.

If desired, the system for cooling an aircraft fuel cell system may also comprise more than two cooling circuits and/or more than two fuel cells. A separate cooling circuit may be assigned to each fuel cell. Alternatively, however, it is also conceivable to cool two or more fuel cells by a common cooling circuit or to use more than one cooling circuit to cool one fuel cell.

Today's operating scenarios assume that when an aircraft equipped with the system for cooling an aircraft fuel cell system is on the ground, both fuel cells of the aircraft fuel cell system are active, i.e., generate electrical energy and therefore waste heat, whereas when the aircraft is in flight, by contrast, only one of the two fuel cells of the aircraft fuel cell system is operated. Furthermore, it is conceivable to operate only one fuel cell when the aircraft is on the ground, for example if the electrical energy generated by one fuel cell is sufficient to provide the energy required on board the aircraft. Owing to the thermal coupling of the two cooling circuits, the cooling system according to the invention makes it possible, when the aircraft equipped with the aircraft fuel cell system is in flight or is on the ground with only one active fuel cell, to use both cooling circuits for cooling the active fuel cell. As a result, an effective and efficient cooling of the active fuel cell is made possible. Furthermore, owing to the thermal coupling of the two cooling circuits, a freezing of the coolant in a cooling circuit can be prevented even when the fuel cell to be cooled by means of the cooling circuit is inactive and therefore does not generate any thermal energy.

The first heat exchanger arranged in the first cooling circuit may be integrated into an outer skin of the aircraft and may be adapted to be flowed through with ambient air. Furthermore, the first heat exchanger may be provided with a plurality of cooling ribs at least in the region of an outer surface facing away from an interior of the aircraft. Similarly, the second heat exchanger may be integrated into an outer skin of the aircraft, may be adapted to be flowed through with ambient air, and may be provided with a plurality of cooling ribs at least in the region of an outer surface facing away from an interior of the aircraft. The cooling ribs ensure in particular an increase of the heat-transferring surface of the first and/or the second heat exchanger and therefore an improvement of the heat-transfer capacity of the first and/or the second heat exchanger.

The ambient air flow led through the first and/or the second heat exchanger is normally a forced flow which is induced by a suitable conveying device, for example a fan or the like, arranged, for example, in the interior of an aircraft equipped with the system for cooling an aircraft fuel cell system. When the aircraft is on the ground, the transfer of the thermal energy, generated by the fuel cells of the aircraft fuel cell system, to the aircraft surroundings is effected predominantly by the ambient air flow led through the first and/or the second heat exchanger. By contrast, when the aircraft is in flight, the cooling ribs provided on an outer surface of the first and/or the second heat exchanger substantially ensure the heat transfer to the aircraft surroundings. When using a conventional cooling system for cooling the fuel cells of the aircraft fuel cell system, however, at least a small ambient air flow through the first and/or the second heat exchanger is generally also required when the aircraft is in flight, in order to ensure proper cooling of the fuel cells.

In contrast to this, when an aircraft equipped with the system for cooling an aircraft fuel cell system according to the invention is in flight, the thermal coupling of the two cooling circuits enables the use of both cooling circuits and therefore both heat exchangers arranged in the cooling circuits for cooling the fuel cell active when the aircraft is in flight. In the cooling system according to the invention, the cooling capacity produced by the cooling ribs of the heat exchangers is therefore sufficient to ensure proper cooling of the active fuel cell. An additional flow of ambient air through the first and/or the second heat exchanger can therefore be dispensed with.

Dispensing with an additional flow of ambient air through the first and/or the second heat exchanger makes it possible to reduce the aerodynamic drag and therefore the fuel consumption of an aircraft equipped with the system for cooling an aircraft fuel cell system according to the invention. Furthermore, the aircraft no longer has to be equipped with special air inlets which, when the aircraft is in flight, enable an ambient air flow through the first and/or the second heat exchanger, but increase the aerodynamic drag and therefore the fuel consumption of the aircraft in flight. It is also possible to dispense with flaps controlling the air flow through the air inlets, as well as actuators required for the actuation of the flaps. As a result, the system complexity is reduced and the reliability of the system as a whole is increased.

In principle, it is conceivable to design the first and the second cooling circuit of the system for cooling a fuel cell system such that a direct coupling of the first to the second cooling circuit is possible. For this purpose, provision may be made, for example, for corresponding connecting lines and valves which, if required, establish a fluid-conducting connection between the first and the second cooling circuit. Such a configuration of the thermal coupling between the first and the second cooling circuit, however, is only appropriate if the same coolant circulates in the first and the second cooling circuit. Alternatively to this, the first cooling circuit may be thermally couplable to the second cooling circuit via a third heat exchanger. As a result, the first and the second cooling circuit can still be formed separately from one another, with the result that, for example in the event of a leak in a cooling circuit, the amount of coolant which escapes is advantageously limited. Furthermore, the cooling circuits can be operated, if desired, also with different coolants.

The third heat exchanger may be thermally couplable to a device to be heated. The waste heat generated by the first and the second fuel cell during operation can then, if required, be used particularly efficiently for heating the device to be heated, before excess thermal energy is removed to the aircraft surroundings via the first and the second heat exchanger. Preferably, the third heat exchanger is then embodied in the form of a 3-way heat exchanger which is adapted both to bring the two cooling circuits of the system for cooling a fuel cell system into thermal contact with one another and to ensure a thermal coupling of the two cooling circuits to the device to be heated.

In a preferred embodiment of the system for cooling a fuel cell system, the device to be heated is a fuel which flows through a fuel supply line which connects a fuel tank to the first and/or the second fuel cell. The fuel tank may be configured in the form of a hydrogen tank. In particular, the hydrogen tank may be a liquid hydrogen tank, thus a hydrogen tank which is adapted to store the hydrogen, to be supplied to the fuel cells of the aircraft fuel cell system as fuel, in a space-saving manner in the liquid state of matter. The third heat exchanger coupling the first to the second cooling circuit can then be advantageously used to heat up and optionally evaporate the fuel stored in the fuel tank before being supplied to the first and/or the second fuel cell. This enables a particularly efficient use of the waste heat generated by the first and the second fuel cell during operation within the system as a whole.

In the third heat exchanger, at least one tube which forms a section of the first cooling circuit may be connected in a heat-transferring manner to at least one tube which forms a section of the second cooling circuit. In particular, the third heat exchanger may be embodied in the form of a tube-bundle heat exchanger, in which a tube bundle forming a section of the first cooling circuit is connected in a heat-transferring manner to a tube bundle forming a section of the second cooling circuit. In particular, tubes assigned to the first cooling circuit and tubes assigned to the second cooling circuit may be connected to one another in a thermally conducting manner in each case in pairs in the third heat exchanger. A thermally conducting connection between the tubes may be produced, for example, by a soldered connection, an adhesively bonded connection or a welded connection.

Furthermore, in the third heat exchanger, the tubes connected in a heat-transferring manner to one another and forming a section of the first cooling circuit and a section of the second cooling circuit may be arranged in a receiving space. Fuel to be heated may flow through the receiving space, i.e., the receiving space can form a section of the fuel supply line connecting the fuel tank to the first and/or the second fuel cell. As a result, a direct heat transfer may be produced from the tubes which form a section of the first cooling circuit and the tubes which form a section of the second cooling circuit to the fuel to be heated flowing around the tubes in the receiving space.

In a method for cooling an aircraft fuel cell system, thermal energy is removed from a first fuel cell by means of a first cooling circuit which is thermally coupled to the first fuel cell. The thermal energy removed from the first fuel cell via the first cooling circuit is transferred to the aircraft surroundings by means of a first heat exchanger arranged in the first cooling circuit. Thermal energy is removed from a second fuel cell by means of a second cooling circuit which is thermally coupled to the second fuel cell. The thermal energy removed from the second fuel cell via the second cooling circuit is transferred to the aircraft surroundings by means of a second heat exchanger arranged in the second cooling circuit. The first cooling circuit is thermally coupled to the second cooling circuit.

When an aircraft equipped with the aircraft fuel cell system is in flight or is on the ground, the first and the second fuel cell may be operated at different power. For example, only the first or the second fuel cell may be operated. The thermal energy which is generated by the fuel cell operated at higher power may be removed via the first and the second cooling circuit and transferred by means of the first and the second heat exchanger to the aircraft surroundings.

When the aircraft equipped with the aircraft fuel cell system is in flight, the thermal energy generated by the first or the second fuel cell is transferred to the aircraft surroundings preferably exclusively via a plurality of cooling ribs which are provided in the region of an outer surface, facing away from an interior of the aircraft, of the first and the second heat exchanger.

The first cooling circuit is preferably thermally coupled to the second cooling circuit via a third heat exchanger.

The third heat exchanger may furthermore be thermally coupled to a device to be heated.

The device to be heated may, for example, be a fuel which preferably flows through a fuel supply line which connects a fuel tank to the first and/or the second fuel cell.

In the third heat exchanger, at least one tube forming a section of the first cooling circuit may be connected in a heat-transferring manner to at least one tube forming a section of the second cooling circuit.

In the third heat exchanger, the tubes connected in a heat-transferring manner to one another and forming a section of the first cooling circuit and a section of the second cooling circuit may be arranged in a receiving space. Preferably fuel to be heated flows through the receiving space.

BRIEF DESCRIPTION OF THE DRAWINGS

Preferred embodiments of the invention will now be explained in more detail with reference to the appended schematic drawings, of which

DETAILED DESCRIPTION OF THE PREFERRED EMBODIMENTS

Figure 1:
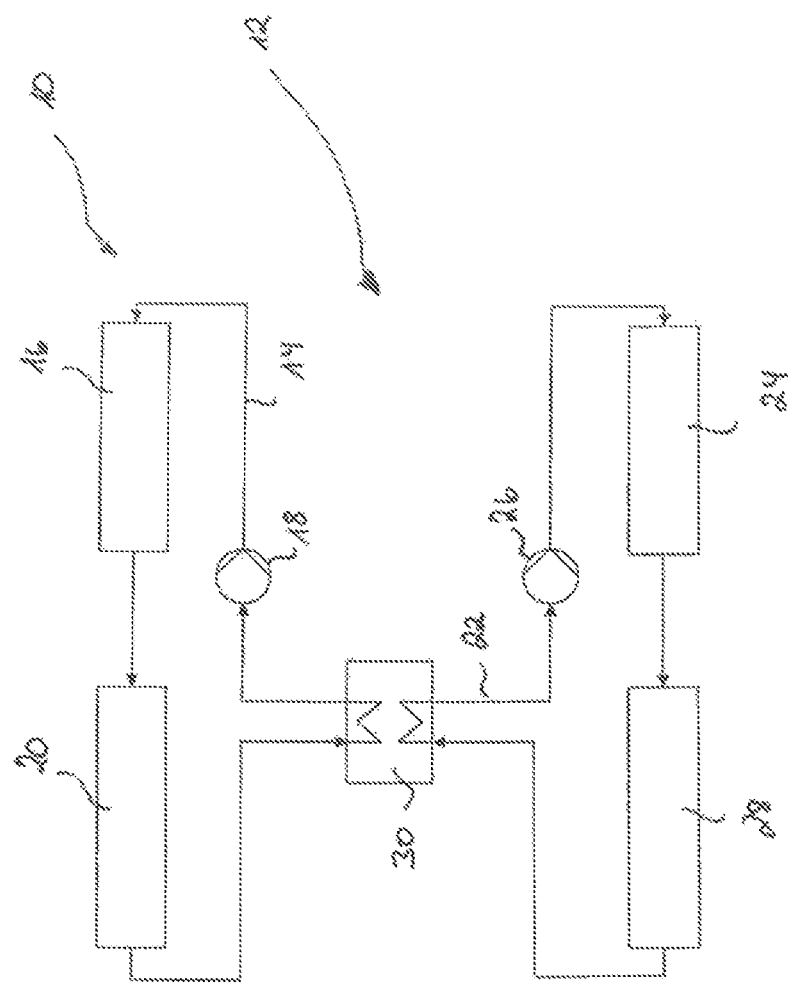
FIG. 1 shows a schematic representation of a first embodiment of a system for cooling an aircraft fuel cell system.

FIG. 1 shows a system 10 which serves to supply an aircraft fuel cell system 12 provided on board an aircraft with cooling energy. The cooling system 10 comprises a first cooling circuit 14 which is thermally coupled to a first fuel cell 16, in order to remove thermal energy generated by the first fuel cell 16 during operation from the first fuel cell 16. A liquid or gaseous coolant can be circulated in the first cooling circuit 14 by means of a first conveying device 18. Furthermore, it is conceivable to circulate in the first cooling circuit 14 a two-phase coolant, i.e., a coolant which is converted from liquid to the gaseous state by the thermal energy of the first fuel cell and subsequently condensed out again in a condenser. If the first cooling circuit 14 is operated with a coolant with phase transition, a throttle valve (not illustrated specifically in FIG. 1) can be arranged in the first cooling circuit 14. For example, the throttle valve can be arranged in the first cooling circuit 14 downstream of the first fuel cell 16. Depending on the state of matter of the coolant flowing through the first cooling circuit 14 in the region of the first conveying device 18, the first conveying device 18 can be configured, for example, in the form of a pump or in the form of a fan.

Furthermore, the system 10 comprises a first heat exchanger 20 which is arranged in the first cooling circuit 14 and serves to transfer thermal energy, removed from the first fuel cell 16 via the first cooling circuit 14, to the aircraft surroundings. The first heat exchanger 20 is configured in the form of an outer-skin heat exchanger integrated into an outer skin of the aircraft and is provided with a plurality of cooling ribs on an outer surface facing away from an interior of the aircraft. Moreover, ambient air can flow through the first heat exchanger 20, i.e., the first heat exchanger 20 has a plurality of cooling channels, through which ambient air can flow. The ambient air flow led through the first heat exchanger 20, if required, is a forced flow which is induced by a suitable conveying device, for example a fan or the like, arranged in the interior of the aircraft equipped with the system 10 for cooling an aircraft fuel cell system 12.

The system 10 for cooling an aircraft fuel cell system 12 furthermore comprises a second cooling circuit 22 which is thermally coupled to a second fuel cell 24, in order to remove thermal energy generated by the second fuel cell 24 during operation from the second fuel cell 24. Similarly to the first cooling circuit 14, the second cooling circuit 22 can, as required, also be operated with a liquid, a gaseous or a two-phase coolant which is conveyed through the second cooling circuit 22 by a second conveying device 26 configured in the form of a pump or in the form of a fan. If the second cooling circuit 22 is operated with a coolant with phase transition, a throttle valve (not illustrated specifically in FIG. 1) can be arranged in the second cooling circuit 22. For example, the throttle valve can be arranged in the second cooling circuit 22 downstream of the second fuel cell 24. A second heat exchanger 28 arranged in the second cooling circuit 14 serves to transfer thermal energy, removed from the second fuel cell 24 via the second cooling circuit 22, to the aircraft surroundings.

Similarly to the first heat exchanger 20, the second heat exchanger 28 is also configured in the form of an outer-skin heat exchanger integrated into an outer skin of the aircraft and is provided with a plurality of cooling ribs on an outer surface facing away from an interior of the aircraft. Moreover, ambient air can flow through the second heat exchanger 28, as in the first heat exchanger 20, i.e., the second heat exchanger 28 likewise has a plurality of cooling channels, through which ambient air can flow. The conveying device serving to convey ambient air through the first heat exchanger 20 can be adapted, if required, also to induce a forced ambient air flow through the second heat exchanger 28. Alternatively to this, however, a separate conveying device for conveying ambient air through the second heat exchanger 28 may also be present.

The aircraft fuel cell system 12 to be cooled by means of the cooling system 10 therefore comprises two fuel cells 16, 24 which generate heat during operation and which are cooled by the two cooling circuits 14, 22 formed, in principle, separately from one another. The first cooling circuit 14 can, however, be thermally coupled to the second cooling circuit 22, so that a heat transfer between the two cooling circuits 14, 22 is possible. In particular, the first cooling circuit 14 can be thermally coupled to the second cooling circuit 22 via a third heat exchanger 30. In principle, it is conceivable always to lead the coolant, flowing through the first and the second cooling circuit 14, 22, through the third heat exchanger 30 and thereby establish a permanent thermal coupling of the cooling circuits 14, 22. Alternatively to this, however, it is also possible to equip the system 10 with corresponding valves and corresponding bypass lines which make it possible to lead the coolant, circulating in the first and/or the second cooling circuit 14, 22, selectively either through the third heat exchanger 30 or past the third heat exchanger 30. Such a configuration of the system 10 enables a merely temporary thermal coupling of the cooling circuits 14, 22.

In the following, the operation of the system 10 for cooling an aircraft fuel cell system 12 is explained in more detail. When an aircraft equipped with the system 10 is on the ground, both fuel cells 16, 24 of the aircraft fuel cell system 12 are active, i.e., both fuel cells 16, 24 of the aircraft fuel cell system 12 generate electrical energy and therefore waste heat. The waste heat generated by the fuel cells 16, 24 is removed in each case from the fuel cells 16, 24 via the corresponding cooling circuits 14, 22 assigned to the fuel cells 16, 24 and is removed to the aircraft surroundings via the heat exchangers 20, 28 arranged in the cooling circuits 14, 22. In order to ensure proper heat removal from the fuel cells 16, 24 of the aircraft fuel cell system 12 when the aircraft is on the ground, in particular at high ambient temperatures, a forced ambient air flow through the first and the second heat exchanger 20, 28 is induced by the conveying device(s) provided in the interior of the aircraft.

If a thermal coupling is permanently provided between the cooling circuits 14, 22 of the cooling system 10 or is actively established, for example by suitable control of corresponding valves, a redundant cooling of the two fuel cells 16, 24 of the aircraft fuel cell system 12 is ensured by the thermal coupling of the cooling circuits 14, 22 when an aircraft equipped with the system 10 is on the ground. For example, in the event of a failure of one cooling circuit 14, 22, the cooling circuit 14, 22 which is still functional can be used to ensure an emergency cooling of both fuel cells 16, 24 until the operation of the fuel cell 16, 24, supplied with cooling energy by the failed cooling circuit 14, 22, has been properly ended.

By contrast, when an aircraft equipped with the system 10 is in flight, in particular when it is cruising, only one of the two fuel cells 16, 24 of the aircraft fuel cell system 12 is operated. If no permanent thermal coupling is provided between the cooling circuits 14, 22 of the cooling system 10, the thermal coupling of the cooling circuits 14, 22 is then actively established, for example by suitable control of corresponding valves. As a result, it is possible to use both cooling circuits 14, 22 and therefore both heat exchangers 20, 28 arranged in the cooling circuits 14, 22 for cooling the active fuel cell 16, 24, so that an effective and efficient cooling of the active fuel cell 16, 24 can be realized. In particular, the cooling capacity produced by the cooling ribs of the heat exchangers 20, 28 is sufficient to ensure proper cooling of the active fuel cell 16, 24. An additional flow of ambient air through the first and/or the second heat exchanger 20, 28 can therefore be dispensed with, as a result of which the aerodynamic drag and therefore the fuel consumption of the aircraft equipped with the system 10 for cooling an aircraft fuel cell system 12 can be reduced. Finally, a freezing of the coolant in the cooling circuit 14, 22 assigned to the inactive fuel cell 16, 22 is prevented by the thermal coupling of the two cooling circuits 14, 22.

Figure 2:
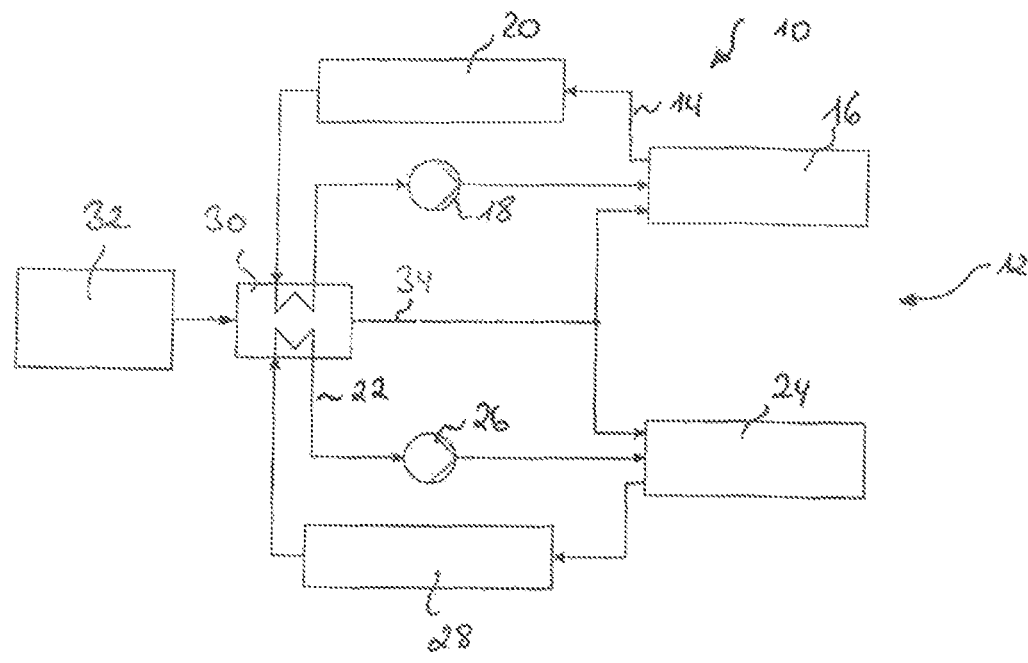
FIG. 2 shows a schematic representation of a second embodiment of a system for cooling an aircraft fuel cell system.

The system 10 for cooling an aircraft fuel cell system 12 shown in FIG. 2 differs from the arrangement according to FIG. 1 in that the third heat exchanger 30, which ensures a thermal coupling of the two cooling circuits 14, 22 of the cooling system 10, can be additionally thermally coupled to a device to be heated. The device to be heated is a fuel which flows through a fuel supply line 34 which connects a fuel tank 32 to the first and the second fuel cell 16, 24. The fuel tank 32 is configured in the form of a liquid hydrogen tank which is adapted to store hydrogen in the liquid state of matter. The hydrogen is supplied as fuel to the anodes of the fuel cells 16, 24 of the aircraft fuel cell system 12. On flowing through the third heat exchanger 30, the fuel stored in the fuel tank 32 is heated up and optionally evaporated before being supplied to the first and/or the second fuel cell 16, 24.

In principle, it is conceivable always to lead fuel, to be supplied to the fuel cells 16, 24, through the third heat exchanger 30 and thereby establish a permanent thermal coupling of the device to be heated to the third heat exchanger 30. Alternatively to this, however, it is also possible to equip the system 10 with corresponding valves and corresponding bypass lines which make it possible to lead the fuel, flowing through the fuel supply line 34, selectively either through the third heat exchanger 30 or past the third heat exchanger 30. Such a configuration of the system 10 enables a merely temporary thermal coupling between the device to be heated and the third heat exchanger 30.

Figure 3:
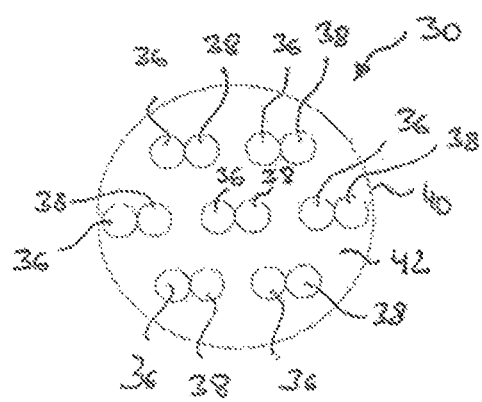
FIG. 3 shows a cross-sectional representation of a heat exchanger used in the system for cooling an aircraft fuel cell system according to FIG. 2.

As can be seen from FIG. 3, the third heat exchanger 30 is embodied in the form of a tube-bundle heat exchanger, in which a tube bundle which forms a section of the first cooling circuit 14 is connected in a heat-transferring manner to a tube bundle which forms a section of the second cooling circuit 22. In particular, tubes 36 assigned to the first cooling circuit 14 and tubes 38 assigned to the second cooling circuit 22 are connected to one another in a thermally conducting manner in each case in pairs in the third heat exchanger 30. For example, the tubes 36, 38 can be soldered, adhesively bonded or welded to one another in pairs.

The tubes 36, 38 forming a section of the first cooling circuit 14 and a section of the second cooling circuit 22 are arranged in a receiving space 42 delimited by an outer casing 40 of the third heat exchanger 30. During operation of the aircraft fuel cell system 12, the fuel to be heated flows through the receiving space 42, i.e., the receiving space 42 forms a section of the fuel supply line 34 connecting the fuel tank 32 to the fuel cells 16, 24. As a result, a direct heat transfer is produced from the tubes 36, 38 forming a section of the first cooling circuit 14 and a section of the second cooling circuit 22 to the fuel to be heated flowing around the tubes 36, 38 in the receiving space 42.

In other respects, the structure and the functioning of the system 10 for cooling an aircraft fuel cell system 12 illustrated in FIG. 2 correspond to the structure and the functioning of the arrangement according to FIG. 1.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A system for cooling an aircraft fuel cell system comprising:
    a first cooling circuit thermally coupled to a first fuel cell, in order to remove thermal energy generated by the first fuel cell during operation from the first fuel cell,
    a first heat exchanger arranged in the first cooling circuit and adapted to transfer thermal energy, removed from the first fuel cell via the first cooling circuit, to the aircraft surroundings,
    a second cooling circuit thermally coupled to a second fuel cell, in order to remove thermal energy generated by the second fuel cell during operation from the second fuel cell, and
    a second heat exchanger arranged in the second cooling circuit and adapted to transfer thermal energy, removed from the second fuel cell via the second cooling circuit, to the aircraft surroundings, the first cooling circuit being thermally couplable to the second cooling circuit,
    wherein the first fuel cell and the second fuel cell are adapted to operate at different powers, and wherein the first and the second cooling circuit are configured to remove the thermal energy which is generated by the fuel cell operated at a higher power and to transfer the thermal energy which is generated by the fuel cell operated at a higher power by means of the first and the second heat exchanger to the aircraft surroundings.

2. The system according to claim 1, wherein at least one of the first and the second heat exchanger is integrated into an outer skin of the aircraft, is adapted to be flowed through with ambient air, and is provided with a plurality of cooling ribs at least in a region of an outer surface facing away from an interior of the aircraft.

3. The system according to claim 1, wherein the first cooling circuit is thermally couplable to the second cooling circuit via a third heat exchanger.

4. The system according to claim 3, wherein the third heat exchanger is thermally couplable to a device to be heated.

5. The system according to claim 4, wherein the device to be heated is a fuel which flows through a fuel supply line which connects a fuel tank to at least one of the first and the second fuel cell.

6. The system according to claim 3, wherein in the third heat exchanger, at least one tube forming a section of the first cooling circuit is connected in a heat-transferring manner to at least one tube forming a section of the second cooling circuit.

7. The system according to claim 6, wherein in the third heat exchanger, the tubes connected in a heat-transferring manner to one another and forming a section of the first cooling circuit and a section of the second cooling circuit are arranged in a receiving space, through which fuel to be heated can flow.

8. A method for cooling an aircraft fuel cell system comprising the steps:
    removing thermal energy from a first fuel cell by means of a first cooling circuit which is thermally coupled to the first fuel cell,
    transferring the thermal energy, removed from the first fuel cell via the first cooling circuit, to the aircraft surroundings by means of a first heat exchanger arranged in the first cooling circuit,
    removing thermal energy from a second fuel cell by means of a second cooling circuit which is thermally coupled to the second fuel cell,
    transferring the thermal energy, removed from the second fuel cell via the second cooling circuit, to the aircraft surroundings by means of a second heat exchanger arranged in the second cooling circuit, the first cooling circuit being thermally coupled to the second cooling circuit,
    wherein, when an aircraft equipped with the aircraft fuel cell system is in flight or is on the ground, the first and the second fuel cell are operated at different powers and the thermal energy which is generated by the fuel cell operated at a higher power is removed via the first and the second cooling circuit and transferred by means of the first and the second heat exchanger to the aircraft surroundings.

9. The method according to claim 8, wherein, when the aircraft equipped with the aircraft fuel cell system is in flight, the thermal energy generated by the first or the second fuel cell is transferred to the aircraft surroundings exclusively via a plurality of cooling ribs which are provided in the region of an outer surface, facing away from an interior of the aircraft, of the first and the second heat exchanger.

10. The method according to claim 8, wherein the first cooling circuit is thermally coupled to the second cooling circuit via a third heat exchanger.

11. The method according to claim 10, wherein the third heat exchanger is thermally coupled to a device to be heated.

12. The method according to claim 11, wherein the device to be heated is a fuel which flows through a fuel supply line which connects a fuel tank to at least one of the first and the second fuel cell.

13. The method according to claim 10, wherein, in the third heat exchanger, at least one tube forming a section of the first cooling circuit is connected in a heat-transferring manner to at least one tube forming a section of the second cooling circuit.

14. The method according to claim 13, wherein, in the third heat exchanger, the tubes connected in a heat-transferring manner to one another and forming a section of the first cooling circuit and a section of the second cooling circuit are arranged in a receiving space, through which fuel to be heated flows.

* * * * *